(12) United States Patent
Doree et al.

(10) Patent No.: US 12,301,633 B2
(45) Date of Patent: May 13, 2025

(54) GENERATING AND SAVING CORRELATION IDENTIFIERS IN CONTEXT OF SERVICES

(71) Applicant: Orange, Issy-les-Moulineaux (FR)

(72) Inventors: José Doree, Châtillon (FR); Jean Claude Le Rouzic, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/002,944

(22) PCT Filed: Jun. 25, 2021

(86) PCT No.: PCT/FR2021/051171
§ 371 (c)(1),
(2) Date: Dec. 22, 2022

(87) PCT Pub. No.: WO2021/260337
PCT Pub. Date: Dec. 30, 2021

(65) Prior Publication Data
US 2023/0353601 A1    Nov. 2, 2023

(30) Foreign Application Priority Data
Jun. 26, 2020   (FR) ........................................ 2006716

(51) Int. Cl.
*H04L 65/1016*    (2022.01)
*H04L 65/1104*    (2022.01)

(52) U.S. Cl.
CPC ...... *H04L 65/1016* (2013.01); *H04L 65/1104* (2022.05)

(58) Field of Classification Search
CPC .......................... H04L 65/1016; H04L 65/1104
(Continued)

(56) References Cited

U.S. PATENT DOCUMENTS

| 8,417,791 B1 * | 4/2013 | Peretz | H04L 63/08 |
| | | | 709/219 |
| 10,757,557 B1 * | 8/2020 | Chiang | H04L 65/80 |

(Continued)

FOREIGN PATENT DOCUMENTS

WO    WO 2008/089693 A1    7/2008

OTHER PUBLICATIONS

International Search Report and Written Opinion dated Sep. 7, 2021 for Application No. PCT/FR2021/051171.
(Continued)

*Primary Examiner* — David P Zarka
(74) *Attorney, Agent, or Firm* — Knobbe, Martens, Olson & Bear, LLP

(57) ABSTRACT

A method for processing messages, implemented by a device in a telecommunication network, is described. The method includes obtaining a correlation identifier, associated uniquely with a service performed by the telecommunication network and allowing the establishment of a correlation between messages that are associated with the service, regardless of the protocols with which the messages conform and/or of the interfaces over which the messages are conveyed. The method also includes saving the correlation identifier in a context associated with the service, and sending at least one message with a view to performing the service, each message sent comprising the correlation identifier saved in the context associated with the service.

17 Claims, 11 Drawing Sheets

(58) Field of Classification Search
USPC .......................................................... 709/228
See application file for complete search history.

(56) References Cited

U.S. PATENT DOCUMENTS

| | | | | |
|---|---|---|---|---|
| 2008/0270542 | A1* | 10/2008 | Tu ...................... | H04L 65/1104 709/206 |
| 2014/0112257 | A1* | 4/2014 | Yi .......................... | H04L 65/40 370/328 |
| 2015/0074265 | A1* | 3/2015 | Ando ...................... | H04L 67/02 709/224 |
| 2015/0341768 | A1* | 11/2015 | Dunn ...................... | H04W 4/90 455/404.2 |
| 2016/0100435 | A1* | 4/2016 | Bakker ............... | H04L 65/1104 455/404.1 |
| 2016/0285630 | A1* | 9/2016 | Abraham .............. | H04L 9/3242 |
| 2017/0331823 | A1* | 11/2017 | Batchu ................ | H04L 63/0876 |
| 2019/0087562 | A1* | 3/2019 | Roennow .............. | G06Q 20/108 |
| 2020/0383100 | A1* | 12/2020 | Yu ........................ | H04W 72/02 |
| 2021/0021979 | A1* | 1/2021 | Chiang ................ | H04M 3/5116 |
| 2021/0051183 | A1* | 2/2021 | Komáromi .......... | H04L 65/1036 |

OTHER PUBLICATIONS

Bertz et al. "Diameter Credit-Control Application; rfc8506.txt" Mar. 1, 2019 (Mar. 1, 2019). pp. 1-130. Diameter Credit-Control Application; RFC8506.TXT. Internet Engineering Task Force. IETF; Standard. Internet Society (ISOC) 4. Rue Des Falaises CH-1205 Geneva, Switzerland. Retrieved from the Internet: https://tools . ietf.org/html/rfc8506 [retrieved on Mar. 1, 2019].

* cited by examiner

```
SIP-Correlation-ID package
Package Name: SIP Correlation Id Package
PackageID: SipCorrelationId (zz)
Description: This package contains sip correlation ID associated to the
context.
Version: 1
Extends: None
1 Properties
1.1 SIP-Correlation-ID
Property Name: SIP correlation ID associated to context
PropertyID: correlation_id (0x0001)
Description: The value of this property gives sip correlation-ID associated to
a context.
Type: Integer
Possible values: string
Default: None
Defined in: ContextAttribute
Characteristics: Read/Write
```

GENERATING AND SAVING CORRELATION IDENTIFIERS IN CONTEXT OF SERVICES

RELATED APPLICATIONS

This application is the U.S. National Phase of Application No. PCT/FR2021/051171 entitled "METHOD FOR PROCESSING MESSAGES EXCHANGED IN A TELECOMMUNICATION NETWORK, FOR EXAMPLE FOR THEIR ANALYSIS" and filed Jun. 25, 2021, which claims the benefit of French Patent Application No. 2006716, filed Jun. 26, 2020, each of which is incorporated by reference in its entirety.

PRIOR ART

The invention relates to the general field of telecommunications. It relates more particularly to a solution allowing to extract messages, for example signaling messages exchanged between pieces of equipment of a communication network, with a view in particular to analyzing these messages.

As is known, operators have chosen, for IP telephony, to rely on the session establishment protocol SIP (Session Initiation Protocol). In the IMS (IP Multimedia Subsystem) network architecture defined by the 3GPP standard, this SIP protocol allows to exchange signaling messages between all the nodes of the IMS network constituting it, and in particular between the pieces of user equipment UE, the P-CSCF (Proxy-Call Session Control Function), I-CSCF (Interrogating CSCF) and S-CSCF (Serving CSCF) devices, Application Servers AS, voice mail, etc.

The SIP protocol is structured in different layers defined in document RFC 3261 (Request for Comment): Transport, Transaction, Dialog, Session.

In accordance with document RFC 3261, an SIP dialogue represents a peer-to-peer SIP relationship between two agents UA (User Agents) that persists for a certain period of time. The dialog facilitates the chaining of messages between user agents and the routing of requests between these agents. The dialog represents a context in which it is possible to interpret SIP messages. A dialog is identified at each UA agent with a dialog identifier (Dialog ID) which comprises three parameters Call-ID, localTag and remoteTag.

In a simple network architecture, all the signaling messages relating to the same session, such as for example an audio/video call, a chat in MSRP (Message Session Relay Protocol, . . . ), share the same dialogue and therefore the same Call-ID dialogue information and tags (localTag, remote Tag). It is then relatively simple to identify and analyze the signaling messages relating to a given session or to a given user in the event of a problem from this dialogue information.

However, in the architectures of operational networks, there are, in particular for security reasons but not exclusively, entities called B2BUA (Back-to-Back User Agent) entities which, rather than using the same dialogue upstream and downstream of their traversal, modify dialog information and perform dialog abutment. In this case, the analysis of the signaling messages associated with a given session becomes highly complicated.

This difficulty has been addressed by introducing a new Session-ID header described in RFC 7989 (tools.ietf.org/html/rfc7989). Since this Session-ID header is kept when passing through B2BUAs and proxies, it allows to maintain a connection between different transactions associated with the same session. However, using this header has several disadvantages.

The Session-ID header is indeed made up of a unique identifier of the emitter "local-uuid" and a unique identifier of the receiver "remote-uuid" (the information "local-uuid" and "remote-uuid" present in a request being inverted in the responses). The header can therefore only be known after having received the first response from the remote piece of equipment. This remote piece of equipment may change during the call logic (for example in the event of successive connections to voice servers before the receiver, due to the implementation of a call transfer logic in the absence of response, in the event of a call transfer, . . . ), the local-uuid part and/or the remote-uuid part of the header may change during the progress of the call depending on the pieces of equipment involved during the call. The fact that information contained in the Session-ID header of RFC 7989 can evolve during the course of the session, and the permutation of the 'local-uuid'/'remote-uuid' information according to the direction of the message make the use of this header very complicated.

Another disadvantage relating to the use of this Session-ID header as defined in RFC 7989 lies in the fact that this header is intended and used only for the identification of a session (that is to say a communication establishing a media). It cannot therefore be used to analyze messages exchanged outside a session, for example an exchange of messages when saving a terminal, a set of exchanges of independent requests but related to the implementation of a single service, for example an SMSoIP (SMS over IP) service, etc.

Another disadvantage is that this header is defined for the SIP protocol and therefore can only be used for the analysis of messages conforming with the SIP protocol. However, in an IMS network, the SIP protocol is not the only protocol involved in establishing communications. Pieces of equipment of the network can indeed communicate with each other via interfaces using protocols other than the SIP protocol.

Thus, for example, certain IMS network interfaces may use the Diameter protocol defined in the document IETF RFC 6733 (e.g. Rx/Gx interfaces for establishing the various media streams, Sh interface used by an application server, or Cx interface used by the S-CSCF or Ro/Rf interfaces used for charging ticket management) or the H.248 protocol defined by the ITU (e.g. interface Iq used by the P-CSCF for media flow control, Ix interface used by the IBCF (Interconnection Border Control Function) or Mn interface used by the MGCF (Media Gateway Control Function)). In the mobile package network EPC (Evolved Package Network) which provides access to the IMS network, it is the GTPv2 protocol defined in the 3GPP TS 29.274 V0.3.0 standard which allows to control the resources associated with a mobile piece of equipment during attachment to the network or during the execution of a call for example.

The messages exchanged during communications, in accordance with these protocols, cannot therefore be analyzed from the session-ID header as defined in RFC 7989.

There is therefore a need for a mechanism allowing the analysis of the messages exchanged in an IMS network which does not have the aforementioned disadvantages.

DISCLOSURE OF THE INVENTION

More specifically, the invention relates to a method for processing messages implemented by a device in a telecommunication network, this method comprising:

a step of obtaining an identifier called a correlation identifier, associated uniquely with a service performed by the telecommunication network, said correlation identifier being able to establish a correlation between messages that are associated with said service regardless of the protocols with which said messages conform and/or of the interfaces over which said messages are conveyed;

a step of saving this correlation identifier in a context associated with said service; and a step of sending at least one message with a view to performing said service, each message sent comprising said correlation identifier saved in the context associated with this service.

Correlatively, the invention relates to a device for processing messages comprising:

a module for obtaining an identifier called a correlation identifier associated uniquely with a service performed by a telecommunication network, said correlation identifier being able to establish a correlation between messages that are associated with said service regardless of the protocols with which said messages conform and/or of the interfaces over which said messages are conveyed;

a module for saving this correlation identifier in a context associated with this service;

a communication module; and a control module configured to control that each message sent by the device with a view to performing this service comprises the correlation identifier associated with this service.

In the following, when it is said that a message is sent with a view to performing a service, it means that the message is sent to perform a service or to participate/contribute to the performance of this service with other messages.

As described later, the invention can be implemented by devices of any kind in the network, in particular UE (User Equipment), eNB (evolved Node B), MME (Mobility Management Entity), SGW (Serving Gateway), PGW (Package Data Network Gateway), PCRF (Policy and charging rules function), HSS (Home Subscriber Server), P-CSCF (Proxy-Call Session Control Function), I-CSCF (Interrogating Call Session Control Function), S-CSCF (Serving-Call Session Control Function), TAS (Telephony Application Server), . . . .

The invention also relates to a system comprising at least one device for processing messages as mentioned above. In a particular embodiment, this system comprises:

at least one storage space in which messages containing the correlation identifier associated with this service are stored; and a consultation device configured to extract at least one message from said at least one storage space using the correlation identifier.

The messages can for example be stored in the storage space by one or more probes which scan, for example permanently the network, and save a copy of these messages in the storage space.

The messages associated with the same service all comprise the correlation identifier, and can therefore be retrieved from the storage space(s) using this correlation identifier, by means of an appropriate filter. The messages thus extracted can then be analyzed for example with a view to diagnosing a problem ("troubleshooting") on the network or within the framework of automatic network tests to facilitate the analysis of the results of these tests. The analysis of the extracted messages can be carried out either by an analysis device to which the messages thus extracted are supplied or by an expert.

Very advantageously, the correlation identifier is inserted in the messages, independently of their protocols and of the interfaces on which these messages are conveyed.

Thus, the correlation identifier is able to establish a correlation between messages associated with a service, for a plurality of distinct protocols and/or a plurality of distinct interfaces.

When the invention is implemented in an IMS network, it allows to correlate and analyze all the messages associated with the same service, regardless of their protocols, for example SIP, Diameter, GTPv2, or H.248.

Indeed, in a particular embodiment, the messages received or sent conform with one protocol among the SIP protocol, the Diameter protocol, the GTPv2 protocol and the H.248 protocol.

When the device according to the invention implements two protocols, it can receive the correlation identifier in a message conforming with a first protocol and send a message comprising the correlation identifier according to a second protocol distinct from the first protocol.

This is for example the case of an I-CSCF entity which, within the framework of the same service, receives messages conforming with the SIP protocol and sends messages conforming with the Diameter protocol.

In a particular embodiment of the invention, the correlation identifier is intended to establish the correlation between messages associated with a service, in other words it is specifically provided for this single use.

Thus, and in general, the invention proposes to introduce a correlation identifier associated uniquely with a service performed by a telecommunication network, to save this correlation identifier in a context associated with this service, and to insert this correlation identifier in the messages relating to this service, independently of the protocol of these messages and/or of the interface over which they are sent. In other words, in accordance with the invention, the messages associated with the same service all comprise the same identifier conveyed through all the protocols and all the interfaces requested for the implementation of the service, and which allows to unambiguously connect the messages together. The context in which the correlation identifier is saved may be the context which groups together, in a manner known to a person skilled in the telecommunication profession, all the data necessary for the proper execution of a service.

The messages processed by different pieces of equipment which cooperate for performing a given service can thus be correlated by the correlation identifier proposed by the invention. The identification and analysis of the messages exchanged within the framework of this service are thus greatly facilitated in a very simple way.

The invention can be implemented for any type of service, in particular for a service for saving a terminal in the network, a service for setting up a call on the network, a service for sending a short message (SMS, short message service), a videoconference service, a service for subscription to network event, for example an event notifying a message deposit or a conference event.

Very advantageously, the correlation identifier can be used by the analysis device to collect information on all the messages involved in the implementation of a service, regardless of the protocols of these messages and the interfaces used to exchange these messages. The information collected can be used to establish the diagnosis of a problem ("troubleshooting") or to facilitate the analysis of the results of automatic network tests, a major concern for telecommunication operators, to validate a service, to verify a distribution of charge. The invention can also be implemented in the context of legal interception, for example.

In one embodiment of the processing method according to the invention, the correlation identifier is extracted from a dedicated field of a message received by the device. Thus, when a device receives a message, it verifies whether this message comprises a correlation identifier in this dedicated field and saves it in the context associated with the service provided by this message if it has not already been done. The device can then insert in the messages that it emits to other network devices, regardless of their protocol, and regardless of the interface used, to propagate the correlation identifier so as to correlate all the messages involved in the same service.

When a device receives a message comprising the correlation identifier, the device can propagate the message to another device, after verifying that the correlation identifier is indeed saved in the context associated with the service to which the messages received and propagated (that is to say sent) participate.

The correlation identifier propagated by a device can be identical to that received by the device or derived therefrom.

The identifier can for example consist of a root common to all the messages relating to the service supplemented by additional information before insertion in a message.

In one embodiment, at least part of the correlation identifier, for example the aforementioned root, can be generated randomly.

This additional information may be of any kind. They can for example represent a user of the device who inserts the correlation identifier in the message, a moment of generation of the identifier, . . . .

Additional information can also represent the device that inserts the correlation identifier in the message. This may for example be the IMSI (International Mobile Subscriber Identity) or the IMEI (International Mobile Equipment Identity) for a mobile device and the MAC address (Media Access Control) for a fixed device.

This additional information allows to simply trace all the sessions/subscriptions/services invoked at the initiative of a device or a user.

In one embodiment of the processing method according to the invention, the correlation identifier is generated by said device.

For example, in one embodiment of the processing method according to the invention, the correlation identifier is generated by said device and inserted in a message emitted by said device, when said emitted message is the first message emitted by said device as part of a service.

This is particularly the case for the first device involved in the service, for example the piece of user equipment.

In another embodiment of the processing method according to the invention, the correlation identifier is generated by said device, upon receiving a message relating to a service and not comprising a correlation identifier. Thus, when the first piece of equipment involved in the service is not in accordance with the invention or is not able to generate the correlation identifier, the latter can be generated by the first piece of equipment in the chain of devices involved in the service upon receiving a message which, although participating in the same service, does not comprise a correlation identifier.

In one embodiment, each message sent with a view to performing a service comprises the correlation identifier associated with this service unless this message is sent over a communication interface verifying a predefined criterion.

This predefined criterion can for example be that the communication interface is a radio interface. This embodiment avoids overloading the messages conveyed on the air interface, between the base station eNodeB and the terminals UE, and thus saves radio resources.

As a variant, this predefined criterion may be that the communication interface is an interface between two given pieces of equipment of the network, for example between the MME entity and the station eNodeB, for which the analysis of the messages exchanged between these two pieces of equipment is not useful.

In one embodiment, each message sent with a view to performing a service comprises the correlation identifier associated with this service unless this message is sent to an external network verifying a predefined criterion.

This predefined criterion may be that the external network does not have an agreement with the network in which the invention is implemented.

These examples of criteria are not exhaustive and other criteria may be considered.

The method for processing messages can be implemented by a computer program.

Consequently, the invention also relates to a computer program on a recording medium, this program being capable of being implemented in a computer, this program comprises instructions allowing the implementation of a method as described above.

This program may use any programming language, and be in the form of source code, object code, or intermediate code between source code and object code, such as in partially compiled form, or in any other desirable form.

The invention also relates to an information medium or a recording medium readable by a computer, and comprising instructions of a computer program as mentioned above.

The information or recording medium can be any entity or device capable of storing programs. For example, the media may comprise a storage medium, such as a ROM, for example a CD ROM or a microelectronic circuit ROM, or else a magnetic recording medium, for example a floppy disk or a hard disk, or flash memory.

On the other hand, the information or recording medium may be a transmissible medium such as an electrical or optical signal, which may be conveyed via an electrical or optical cable, by radio connection, by wireless optical connection or by other ways.

The program according to the invention can in particular be downloaded from an Internet-type network.

Alternatively, the information or recording medium may be an integrated circuit in which a program is incorporated, the circuit being adapted to execute or to be used in the execution of one of the methods as described above.

BRIEF DESCRIPTION OF THE DRAWINGS

Other characteristics and advantages of the present invention will become apparent from the description given below, with reference to the appended drawings which illustrate an example of embodiment devoid of any limiting character. In the figures:

FIG. 3B shows an example of declaration of an H.248 package defining the correlation identifier CID for the H.248 protocol in accordance with a particular embodiment of the invention;

DETAILED DESCRIPTION OF SEVERAL PARTICULAR EMBODIMENTS

Figure 1:
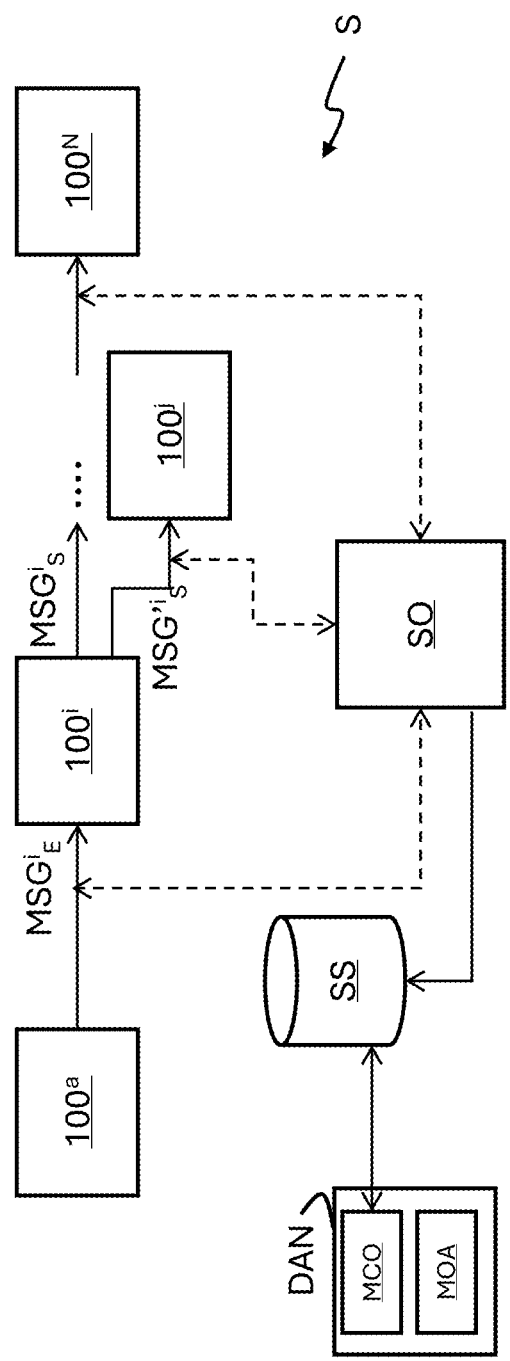
FIG. 1 shows a system according to a particular embodiment of the invention.

FIG. 1 shows a system S in accordance with a particular embodiment of the invention in a telecommunication network managed by an operator OP. The system S comprises a set of devices $100^i$, i=1, ..., N for processing messages in accordance with the invention, a probe SO, a storage space SS, and an analysis device DAN.

The message processing devices $100^i$ are configured to communicate with each other via various communication interfaces, by means of messages $MSG^i_E$, $MSG^i_S$, $MSG'^i_S$, conforming with identical or different protocols in order to cooperate in performing a given service (saving a piece of user equipment in a network, establishing communication between several pieces of equipment, setting up a videoconference, ... ). In this sense, these messages are considered to be associated with this service and each or some of the pieces of equipment memorizes, in a known manner, a context to store the elements necessary for the performance of this service.

The message processing devices $100^i$ are configured in accordance with the invention to save in the context associated with the service a correlation identifier CID associated uniquely with this service, and allowing to correlate the messages exchanged within the framework of this service with each other. In the embodiment described here, it is assumed that a dedicated field intended to contain this correlation identifier CID has been provided in each protocol used by the telecommunication network, this dedicated field possibly varying from one protocol to another.

In this figure and thereafter, a message received by the processing device $100^i$ is denoted $MSG^i_E$ and messages emitted by the processing device $100i$ are denoted $MSG^i_S$, $MSG'^i_S$ within the framework of this cooperation.

As described later, these devices $100^i$ are configured to insert in all the messages participating in a service (possibly with a few exceptions), the correlation identifier CID saved in the context associated with this service, allowing to establish a connection between messages belonging to the same service, regardless of the protocols with which these messages conform and of the interfaces on which these messages are conveyed.

In the description below, the devices $100^i$ are configured to all insert the same correlation identifier CID for a given service. Alternatively, different correlation identifiers but derived from each other and comprising a common root (for example supplemented by a variable suffix and/or prefix) can be used, the important thing being to be able to connect the correlation identifiers inserted in all the messages implemented in the performance of a given service, and to be able to easily filter the messages relating to the same service from the common root.

The probe SO is configured to scan the network and save a copy of these messages in the storage space SS, for example in trace files. The messages which carry out the same service comprise, in a field predefined by the protocol of this message, a correlation identifier associated with this service.

The analysis device DAN comprises a consultation module MCO configured to extract the messages from the storage space SS using the correlation identifier CID associated with a service and a module MOA capable of triggering the analysis of these messages. It should be noted that the triggering of the analysis of the messages can consist in transmitting them to the operator OP of the network or to a third party entity for analysis. The invention thus allows to analyze all the messages associated with the same service on the basis of the correlation identifier CID comprised in these messages.

Figure 2:
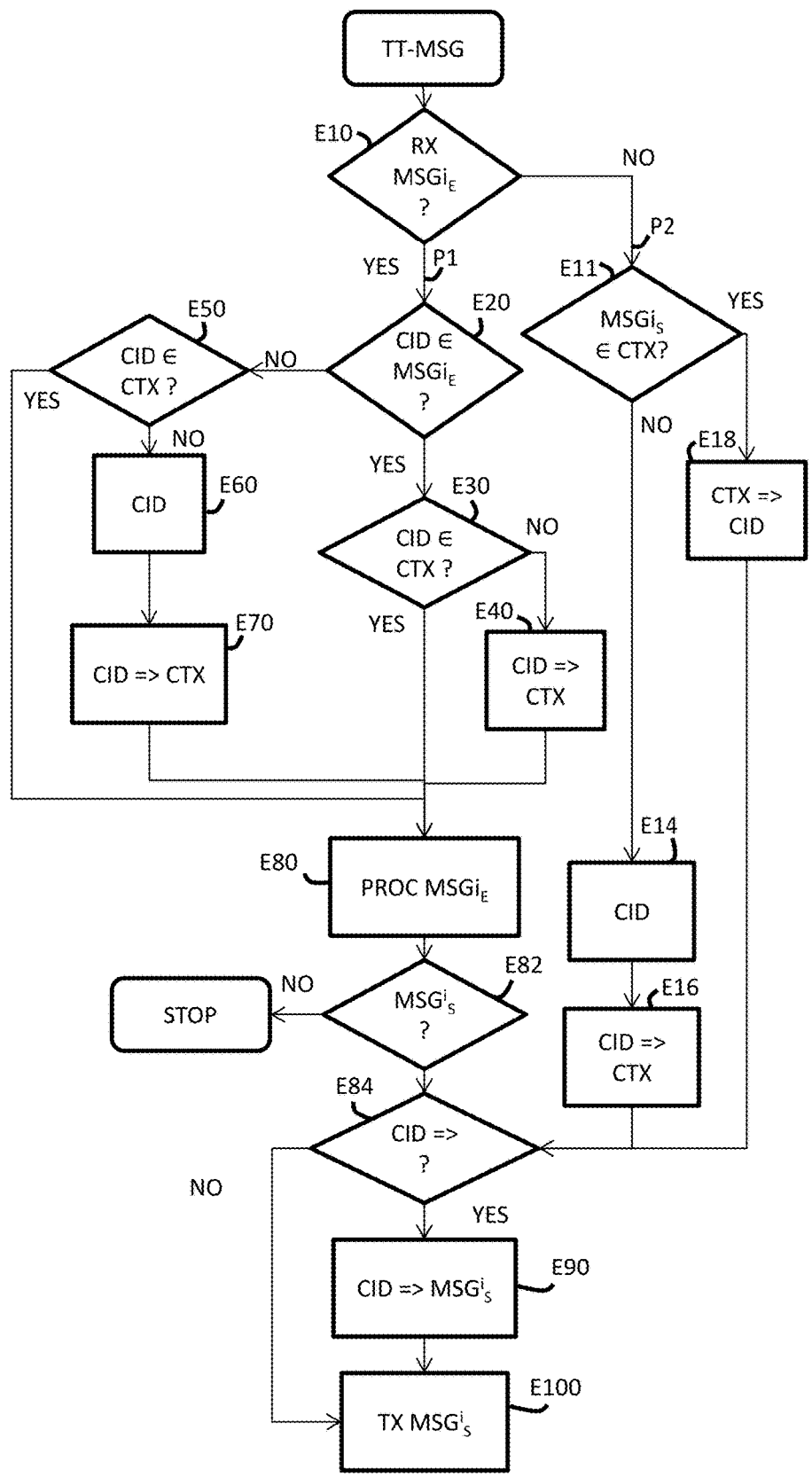
FIG. 2 shows in the form of a flowchart the main steps of a method for processing messages in accordance with a particular embodiment of the invention.

FIG. 2 shows the main steps of a method for processing messages in accordance with the invention, implemented by a device $100^i$.

This method involves two processes:
  the process P1 is implemented by the device $100^i$ to emit at least one message $MSG^i_S$, after the reception of an incoming message $MSG^i_E$; and
  the process P2 is implemented by the device $100^i$ to emit at least one message $MSG^i_S$, this emission not being related to the reception of a message by this device.

It is assumed that the device $100^i$ receives a message $MSG^i_E$ during a step E10 and that it triggers the execution of the process P1.

During a step E20, the device $100^i$ verifies whether the message $MSG^i_E$ received in step E10 comprises a correlation identifier CID. If this is the case, the result of the test E20 is positive, otherwise it is negative.

In the embodiment described here, as mentioned previously, each protocol defines a dedicated field intended to contain the correlation identifier CID.

Consequently, in step E20, the device $100^i$ verifies whether the message $MSG^i_E$ comprises the dedicated field defined by the protocol of this message intended to contain the correlation identifier CID. If this field exists in the message $MSG^i_E$ and comprises a value, this value is considered to be a correlation identifier CID within the meaning of the invention.

If the message $MSG^i_E$ received in step E10 comprises a correlation identifier CID, the device $100^i$ verifies during a step E30 whether this correlation identifier CID is saved in the context CTX associated with the service to which the message $MSG^i_E$ contributes or under which this message is exchanged. In a manner known to the person skilled in the art, the context CTX associated with a service groups together all the data necessary for the proper execution of this service; the person skilled in the art knows how to associate a received message with the context of the service to which this message relates.

If this is not the case, the result of the test E30 is negative and the device $100^i$ saves, during a step E40, the correlation identifier CID in the context CTX associated with the service performed by the message $MSG^i_E$.

If the message $MSG^i_E$ received in step E10 does not comprise a correlation identifier (result of the negative test E20), the device $100^i$ verifies during a test E50 whether the context CTX associated with the service performed by the message $MSG^i_E$ already comprises a correlation identifier CID.

If this is not the case, the result of the test E50 is negative and the device $100^i$ generates a correlation identifier CID during a step E60, then saves, during a step E70, this correlation identifier CID in the context CTX associated with the service performed by the message $MSG^i_E$.

The correlation identifier CID associated with a service can be randomly generated. It can also consist of several parts, for example:
- a common part (or root) allowing to identify and correlate the messages participating in the performance of this service;
- a part (e.g. suffix or prefix) identifying a date and time of generation of the correlation identifier CID;
- a part (e.g. suffix or prefix) identifying the device $100^i$ that generated this identifier, or any device $100^i$ through which the identifier was channeled;
- a part (e.g. suffix or prefix) identifying a user of this device.

These different parts are defined according to the processing on the stored messages which may be carried out by the analysis device DAN by applying filters corresponding to one or more of these parts (including the common root).

In the embodiment described here, the test E50 when its result is positive, the test E30 when its result is positive, the step E40 and the step E70 are followed by a step E80 during which the message $MSG^i_E$ received in step E10 is processed. This processing depends on the message $MSG^i_E$ and the logic of the service to which it relates. It is not part of the invention. Various processing examples will be described later.

In the embodiment described here, the device $100^i$ determines, during a step E82, whether the device $100^i$ must send at least one message $MSG^i_S$ to at least one device 100 of the network after or within the framework of this processing. If this is not the case, the result of the test E82 is negative and the process P1 stops.

If the device $100^i$ must transmit at least one message $MSG^i_S$ to at least one device $100^j$ of the network, the device $100^i$ determines, during a test E84, whether the correlation identifier CID must be inserted in this message.

In accordance with the invention, the correlation identifier CID is inserted in each message emitted by the device $100^i$ within the framework of the service considered in order to be able to easily correlate the messages exchanged by the various entities of the network relating to this service. However, in a particular embodiment, some exceptions can be considered, in particular with a view to saving network resources, or when the messages are emitted to another network that the operator OP does not control. For example, it can be decided not to insert the correlation identifier CID:
- in the messages sent over a radio communication interface; neither
- in the messages emitted to an external network that does not have an agreement with the network of the operator OP.

Other exceptions can be considered, such as, for example, excluding the transmission of the correlation identifier between two given entities of the network for which it is of little or no interest to analyze the messages exchanged between these entities, so as to preserve network resources.

If the correlation identifier CID must be comprised in a message $MSG^i_S$, the result of the test E84 is positive. When the message $MSG^i_S$ to be sent is a simple transfer (or propagation) of the received message $MSG^i_E$, the device $100^i$ does not strictly speaking need to insert the correlation identifier CID in the message $MSG^i_S$, but just to control that the correlation identifier CID is indeed present in the messages $MSG^i_S$. Otherwise, the device $100^i$ inserts the correlation identifier CID in the message $MSG^i_S$ during a step E90.

The device $100^i$ sends the message to the device 1003 during a step E100.

If the result of the test E84 is negative, the device $100^i$ sends the message $MSG^i_S$ to the device 100 (step E100) without inserting the correlation identifier CID therein.

It is recalled that each of the messages $MSG^i_S$ can be sent by the device $100^i$ according to a protocol identical to or distinct from the protocol of the received message $MSG^i_E$. The examples described below will illustrate in particular situations in which:
- the messages received $MSG^i_E$ and sent $MSG^i_S$ both conform with the SIP protocol;
- the messages received $MSG^i_E$ and sent $MSG^i_S$ both conform with the Diameter protocol;
- the messages received $MSG^i_E$ and sent $MSG^i_S$ respectively conform with the SIP and Diameter protocols.

The method for processing messages in accordance with the invention described here also comprises a process P2 implemented by the device $100^i$ to emit at least one message $MSG^i_S$, this emission not being related to the reception of a message by this device.

During a step E11, the device $100^i$ determines whether the context associated with the service performed by the message $MSG^i_S$ comprises a correlation identifier CID.

If this is not the case, the result of the test E11 is negative and the process P2 comprises a step E14, similar to step E60 during which the device $100^i$ generates a correlation identifier CID and a step E16, similar to step E70, during which the device $100^i$ saves this correlation identifier CID in the context CTX associated with the service performed by the message $MSG^i_S$.

Step E16 is followed by the test E84 already described during which the device $100^i$ determines whether the correlation identifier CID must be inserted in the message $MSG^i_S$.

The message $MSG^i_S$ is transmitted to the device $100^i$, during step E100, this message comprising or not the correlation identifier CID depending on the result of the test E84.

If the device $100^i$ determines (test E11) that the message $MSG^i_S$ participates in a service whose context CTX comprises a correlation identifier CID, the result of the test E11 is positive, and the process P2 obtains (step E18) the correlation identifier saved in this context.

Step E18 is followed by the test E84 already described during which the device $100^i$ determines whether the correlation identifier CID must be inserted in the message $MSG^i_S$. The message $MSG^i_S$ is transmitted to the device $100^j$, during step E100, this message comprising or not the correlation identifier CID depending on the result of the test E84.

In accordance with the invention, the same correlation identifier CID can advantageously be comprised in messages conforming with different protocols and/or emitted on different communication interfaces.

Figure 3A:
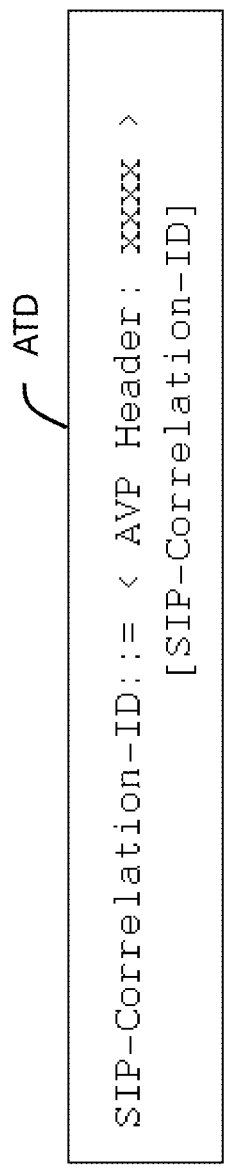
FIG. 3A shows an example of a message field that can be used in a particular embodiment of the invention.

When the message conforms with the Diameter protocol as defined in document IETF RFC 6733, the correlation identifier CID can be comprised in an AVP ("Attribute-Value Pair") field of the message provided for this purpose, for example named by "SIP-Correlation-ID", an example of which referenced ATD is given in FIG. 3A.

When the message conforms with the H248 protocol defined by the ITU-T.H.248.1 standard, the correlation identifier CID can be defined in a new package provided for this purpose, an example of which referenced P248 is shown in FIG. 3B.

When the message conforms with the GTPv2 protocol defined in the 3GPP TS 29.274 specification document, the correlation identifier CID can be inserted in a new information element called for example "SIP-Correlation-ID" provided for this purpose.

The way the method for processing messages according to the invention can be used in the context of various communication services (e.g. setting up a call, etc.) of the prior art will now be illustrated by examples.

Figure 4A:
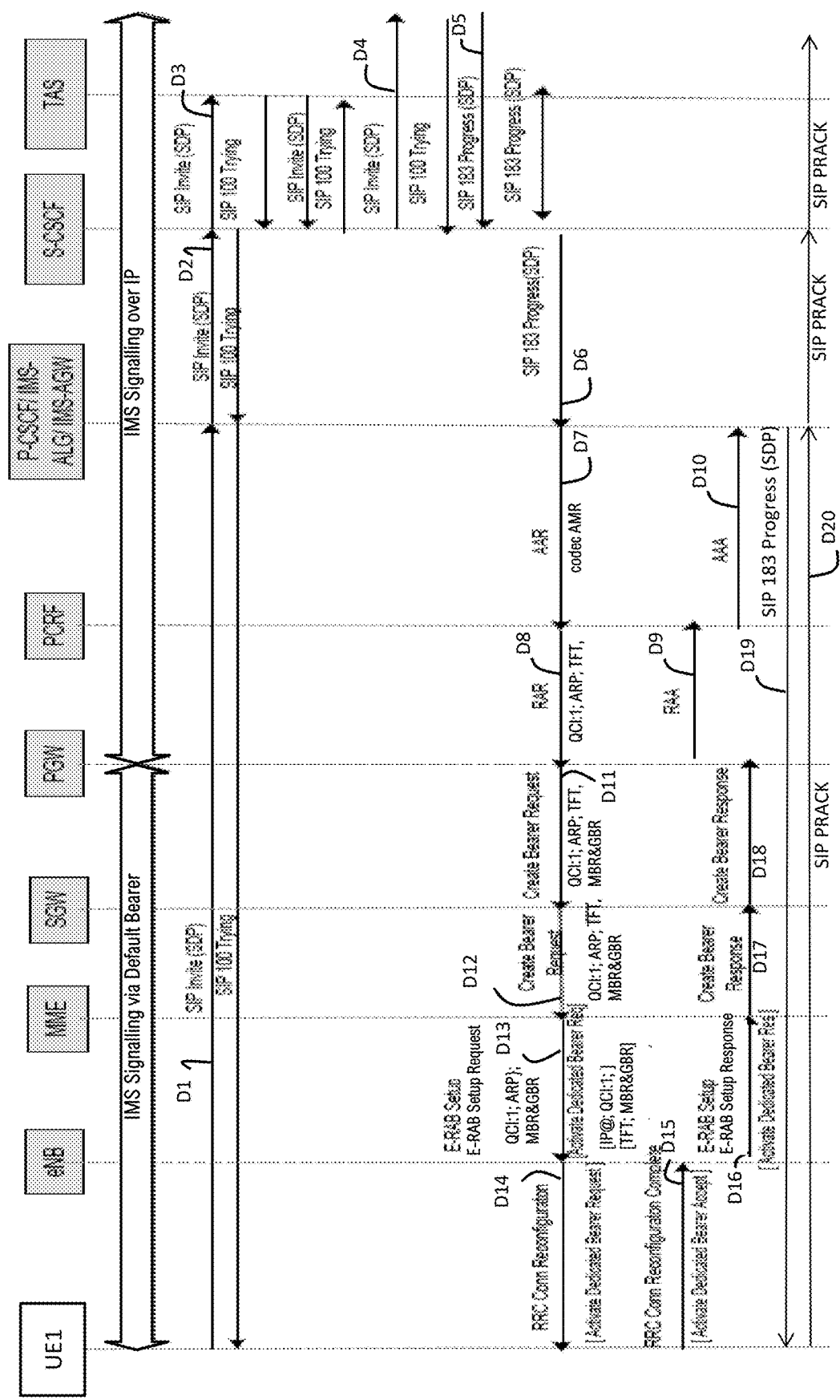
FIG. 4A shows a sequence of messages for setting up a voice call in accordance with the prior art.

Thus, according to a first example, FIG. 4A shows a sequence of messages of a service for setting up a voice call as it is described in the prior art, in FIG. 5 of the document "VoLTE Service Description and Implementation Guidelines Version 1.0 18 Dec. 2014".

During a step D1, a piece of user equipment UE1 sends a message SIP INVITE in which it defines the communication parameters in accordance with the SDP (Session Description Protocol) protocol. This message SIP INVITE is sent to the P-CSCF (Proxy-Call Session Control Function) identified during the registration procedure of the piece of user equipment UE1.

During a step D2, the P-CSCF adds a header comprising billing information (P-Charging-Vector) and transmits the message SIP INVITE to the S-CSCF (Serving CSCF) identified during the registration procedure.

The S-CSCF verifies whether the requested services can be delivered for the piece of user equipment UE1. If this is the case, the S-CSCF conveys, during a step D3, the message SIP INVITE to a TAS (Telephony Application Server) server.

During a step D4, the S-CSCF conveys the message SIP INVITE to the I-CSCF (Interrogating CSCF) in order to determine the S-CSCF of the called party.

During a step D5, the called piece of user equipment UE2 (not shown) returns an SDP answer in a message SIP 183 Progress. The SDP answer indicates that preconditions are also desired, that a confirmation should be sent when the resource reservation preconditions are met on the caller's side, and the media stream is idle.

The message SIP 183 Progress is received by the S-CSCF and transmitted to the P-CSCF (step D6). The P-CSCF uses the SDP answer to configure the IMS-AGW (Access Gateway) if deployed.

During a step D7, the P-CSCF analyzes the SDP answer and sends an MR (Authorize/Authenticate Request) message from the Diameter protocol to the PCRF with the required service information. The PCRF associates the service information with the subscription information corresponding to the authorized services and the quality of service QoS information. The PCRF identifies the IP-CAN (IP-Connectivity Access Network) session that was established during the attachment procedure LTE Attach.

During a step D8, the PCRF sends a RAR (Diameter protocol) request to the PGW (Package Data Network Gateway) gateway to trigger the creation of a bearer dedicated to the voice with the associated service quality parameters.

During a step D9, the gateway PGW acknowledges receipt of the RAR (Diameter protocol) message to the PCRF.

The PCRF then acknowledges receipt of the AAR (Diameter protocol) message to the P-CSCF during a step D10. At this point, the IMS SIP session and the bearer used for voice are connected.

During a step D11, the gateway PGW sends a message Create Bearer Request to the gateway SGW (Serving Gateway) conforming with the GTP-v2 protocol in order to create the bearer for the media VoLTE.

During a step D12, the gateway SGW sends the message Create Bearer Request (GTP-v2 protocol) to the MME (Mobility Management Entity) entity.

During a step D13, the MME entity sends a message E-RAB Setup Request (S1 AP protocol) to the base station eNodeB comprising in particular the quality of service parameters to activate the bearer for the voice traffic.

The base station eNodeB associates these quality of service parameters with those required for the radio bearer, then sends, during a step D14, a connection reconfiguration request RRC Conn Reconfiguration (RRC protocol) to the calling piece of user equipment EU1.

During a step D15, the calling piece of user equipment UE1 sends an acknowledgment message (RRC Conn Reconfiguration Response) (RRC protocol) to the base station eNodeB.

The base station eNodeB acknowledges receipt to the MME entity of the message E RAB Setup Request (by sending a message E-RAB Setup Response) (S1 AP protocol) during a step D16.

During a step D17, the MME entity sends a message Create Bearer Response (GTPv2 protocol) to the gateway SGW to acknowledge receipt of the bearer activation. This message comprises the identity of the bearer and the user's location information.

The gateway SGW transmits this information to the gateway PGW (GTPv2 protocol) during an activity D18.

During a step D19, the P-CSCF transmits the response SIP 183 Progress to the calling piece of user equipment UE1.

During a step D20, the piece of user equipment UE1 generates a message PRACK (SIP protocol) which is transmitted to the call termination side.

Figure 4B:
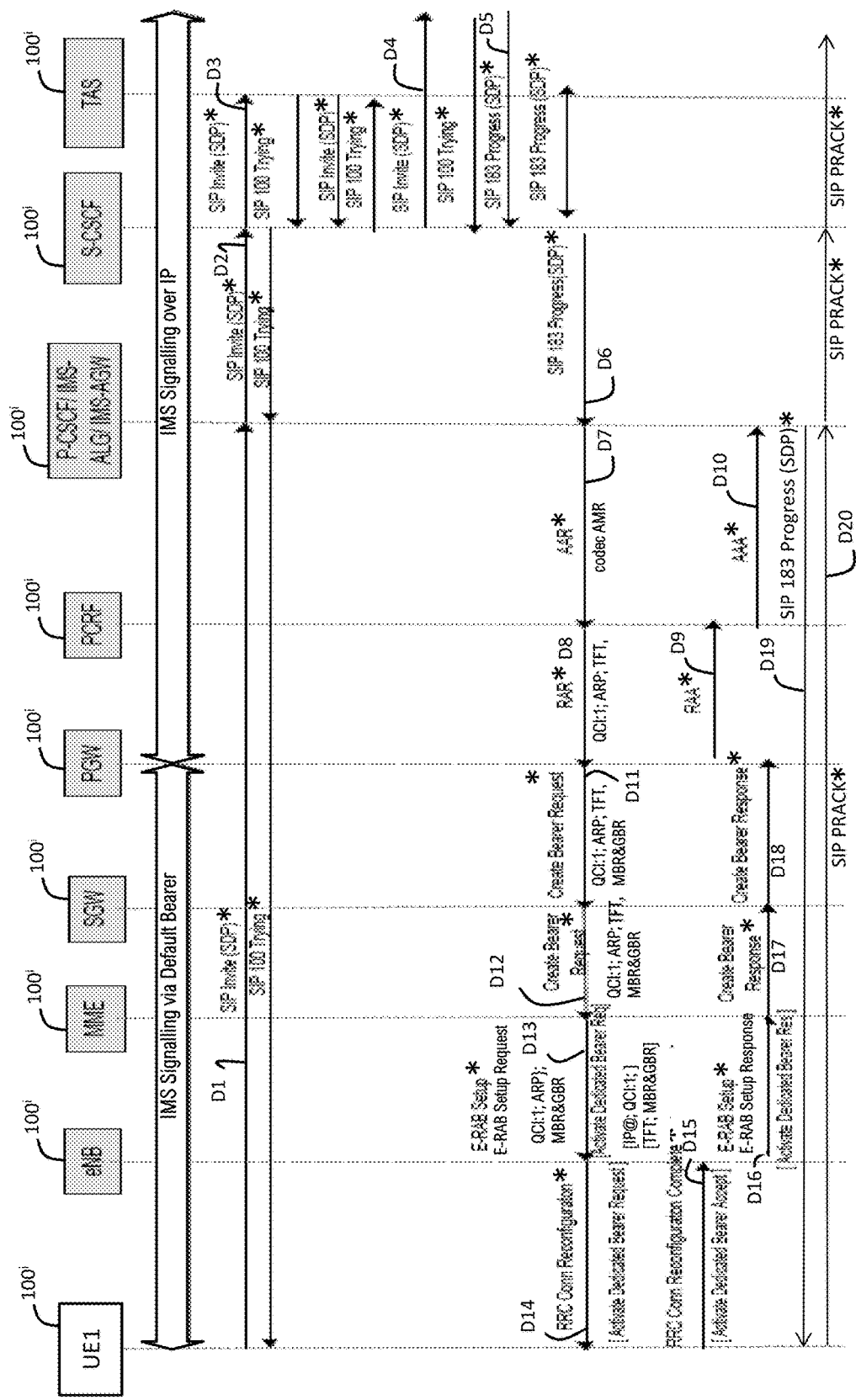
FIG. 4B illustrates an exemplary implementation of the invention in the context of the sequence of messages of FIG. 4A.

FIG. 4B illustrates an exemplary implementation of the invention within the framework of the service for setting up a voice call described above with reference to FIG. 4A.

In this figure, messages are marked with "*" to represent that they comprise a correlation field CID.

In this example, each of the devices UE1, eNB, MME; SGW, PGW, PCRF; P-CSCF, S-CSCF, TAS, I-CSCF and UE2 is a device $100^i$ in accordance with the invention and implements the method for processing messages described with reference to FIG. 2. To better understand the invention and in particular how this is articulated with the sequence of messages contributing to the performance of the voice call setup service shown in FIG. 4A, reference is made in the following, in combination, to the steps of FIG. 4A and the steps of FIG. 2 when the steps of FIG. 2 complement the steps of FIG. 4A.

In this example, when the calling piece of user equipment UE1 wants to send a message SIP INVITE, it executes the process P2 of the method for processing messages. During a step E14, it generates a correlation identifier CID, and saves it in the context CXT associated with the voice call setup service during a step E16 of this method. It inserts the correlation identifier CID in the message SIP INVITE (step E90) and sends this message to the P-CSCF (step D1, step E100).

When the P-CSCF receives this message SIP-INVITE (positive result of the test E10), it creates a context CTX associated with the voice call setup service. It determines (test E20) that this message comprises a correlation identifier CID, and that (test E30) this correlation identifier is not saved in the context CTX. The P-CSCF saves the correlation identifier in the context CTX (step E40) then processes the message SIP INVITE (step E80). This processing consists in particular in adding to the message a header comprising billing information (P-Charging-Vector). The P-CSCF determines (test E82) that it must propagate the message SIP INVITE to the S-CSCF. In the embodiment described here, the P-CSCF controls that the correlation identifier is already inserted in this message SIP INVITE. The P-CSCF propagates the message SIP INVITE to the SCSCF (step E100, step D2).

When the S-CSCF receives the message SIP-INVITE (positive result of the test E10), it creates a context CTX for the voice call setup service. It determines (test E20) that this message comprises a correlation identifier CID, and that (test E30) this correlation identifier is not saved in the context CTX. The S-CSCF saves the correlation identifier in the context CTX (step E40) then processes the message SIP INVITE (step E80). During this processing, the S-CSCF verifies in particular whether the requested services can be delivered for the calling piece of user equipment UE1.

The S-CSCF determines (test E82) that it must propagate the message SIP INVITE to the TAS. In the embodiment described here, the S-CSCF controls that the correlation identifier CID is already comprised in this message SIP INVITE. The S-CSCF propagates the message SIP INVITE to the TAS server (step E100, step D3).

The S-CSCF determines that it must also propagate the message SIP INVITE to the I-CSCF. In the embodiment described here, the S-CSCF determines that the correlation identifier must also be comprised in this message SIP INVITE. The S-CSCF transmits the message SIP INVITE to the I-CSCF (step E100, step D4) so that the latter determines the S-CSCF of the called party.

When the called piece of user equipment UE2 receives the message SIP INVITE (positive result of the test E10), it creates a context CTX for this voice call setup service. It determines (test E20) that this message comprises a correlation identifier CID, and that (test E30) this correlation identifier is not saved in the context CTX. The called piece of user equipment UE2 saves the correlation identifier CID in the context CTX (step E40) then processes the message SIP INVITE (step E80).

During a step E90, the called piece of user equipment UE2 inserts the correlation identifier in the message SIP 183 Progress. The called piece of user equipment UE2 returns the message SIP 183 Progress to the calling piece of user equipment UE1 (step D5, step E100).

When the S-CSCF receives the message SIP 183 Progress, it determines (test E20) that this message comprises a correlation identifier CID and (test E30) that this correlation identifier is already saved in the context CTX of the voice call setup service. It propagates this message SIP 183 Progress to the P-CSCF (step D6).

When the P-CSCF receives the message SIP 183 Progress, it determines (test E20) that this message comprises a correlation identifier CID and (test E30) that this correlation identifier is already saved in the context CTX of the voice call setup service. The P-CSCF processes the message during a step E80, this processing consisting in particular in analyzing the SDP answer contained in the message. It inserts (step E90) the correlation identifier CID in the AAR message of the Diameter protocol using a new field AVP SIP-Correlation-ID defined in this protocol and sends (step E100, step D7) the MR message (Diameter protocol) to the PCRF.

When the PCRF receives the MR message from the Diameter protocol, it creates a context CTX for the voice call setup service. It determines (test E20) that this MR message comprises a correlation identifier CID and (test E30) that this correlation identifier is not saved in the context CTX. The PCRF saves the correlation identifier in the context CTX (step E40) and processes the MR message during a step E80. This processing consists in particular in associating the service information with the subscription information corresponding to the authorized services and the quality of service QoS information. During a step E90 the PCRF inserts the correlation identifier CID in the RAR message of the Diameter protocol. The PCRF sends (step D8, step E100) the RAR request to the gateway PGW.

When the PGW receives the RAR (Diameter protocol) message, it creates a context CTX for the voice call setup service. It determines (test E20) that the RAR message comprises a correlation identifier CID and (test E30) that this correlation identifier CID is not saved in the context CTX. The gateway PGW saves the correlation identifier CID in the context CTX (step E40) and processes the RAR message during a step E80.

During a first instance of step E90, the gateway PGW inserts the correlation identifier CID in the RAA message (Diameter protocol) that it sends (step D9, step E100) to the PCRF.

During a second instance of step E90, the gateway PGW inserts the correlation identifier CID in the message Create Bearer Request conforming with the GTP-v2 protocol that it sends (step D11, step E100) to the gateway SGW (Serving Gateway) to create the bearer for the media VoLTE. The gateway PGW uses for this purpose a new information element of the GTP-v2 protocol defined to carry the correlation identifier CID.

The PCRF inserts the correlation identifier CID in the Diameter protocol MA message that it sends to the P-CSCF (step E100, step D10).

When the SGW receives the message Create Bearer Request (GTP-v2 protocol), it creates a context CTX for the voice call. It determines (test E20) that this message comprises a correlation identifier CID and (test E30) that this correlation identifier CID is not saved in the context CTX. The gateway SGW saves the correlation identifier in the context CTX (step E40) and processes the message Create Bearer Request during a step E80. The gateway SGW propagates the message Create Bearer Request to the MME entity (step E100, step D12).

In the embodiment described here, when the MME entity receives the message Create Bearer Request (GTP-v2 protocol), it creates a context CTX for the voice call setup service. It determines (test E20) that this message comprises a correlation identifier CID and (test E30) that this correlation identifier is not saved in its context CTX. The MME entity saves the correlation identifier in its context CTX (step E40) and processes the message Create Bearer Request during a step E80.

In the embodiment described here, the MME entity decides in step E84 that the correlation identifier CID must be comprised in the message E-RAB Setup Request (S1 AP protocol) that it must send to the base eNodeB to enable the bearer for the voice traffic. The MME entity inserts the correlation identifier CID in the message E-RAB Setup Request (S1 AP protocol) and sends this message to the base station eNodeB (step E100, step D13).

When the base station eNodeB receives the message E-RAB Setup Request, it creates a context CTX for the voice call setup service. It determines (test E20) that this message E-RAB Setup Request comprises a correlation identifier and (test E30) that this correlation identifier is not saved in the context CTX. The base station eNodeB saves the correlation identifier CID in the context CTX (step E40) and processes the message E-RAB Setup Request during a step E80. This processing consists in particular in associating the quality of service parameters with those required for the radio bearer. In the embodiment described here, the base station eNodeB decides (step E84) not to send the correlation identifier CID in the connection reconfiguration request message RRC Conn Reconfiguration that it sends to the calling piece of user equipment UE1 via the radio interface (step E100, step D14).

The calling piece of user equipment UE1 receives the connection reconfiguration request message RRC Conn Reconfiguration and responds thereto by sending a message (RRC Conn Reconfiguration Response) to the base station eNodeB (step E100, step D15).

When the base station eNodeB receives the Response message RRC Conn Reconfiguration, it determines (test E20) that this message participates in the call setup service associated with the context CTX and that this context CTX comprises a correlation identifier CID (test E30). The base station eNodeB inserts the correlation identifier CID in the message E-RAB Setup Response (S1 AP protocol) that it sends to the MME entity (step E100, step D16).

When the MME entity receives the message E-RAB Setup Response, it determines (test E20) that this message comprises a correlation identifier CID and (test E30) that this correlation identifier is already saved in the context CTX associated with the call setup service. The MME entity inserts the correlation identifier CID in the message Create Bearer Response (GTPv2 protocol) that it sends to the gateway SGW (step E100, step D17).

When the gateway SGW receives the message Create Bearer Response, it determines (test E20) that this message comprises a correlation identifier CID and (test E30) that this correlation identifier is already saved in the context CTX associated with the call setup service. The gateway SGW propagates the message Create Bearer Response to the gateway PGW (step E100, step D18).

The P-CSCF inserts the correlation identifier CID in the response SIP 183 Progress that it transmits to the calling piece of user equipment UE1 (step D19).

The calling piece of user equipment UE1 inserts the correlation identifier CID in the message SIP PRACK that it transmits to the call termination side (step D20).

In the embodiment described above, the MME entity has decided in step E84 that the correlation identifier CID must be sent in the message E-RAB Setup Request (S1 AP protocol) to the base station eNodeB.

In another embodiment, in step E84, the MME entity decides not to send the correlation identifier CID to the base station eNodeB.

Figure 5A:
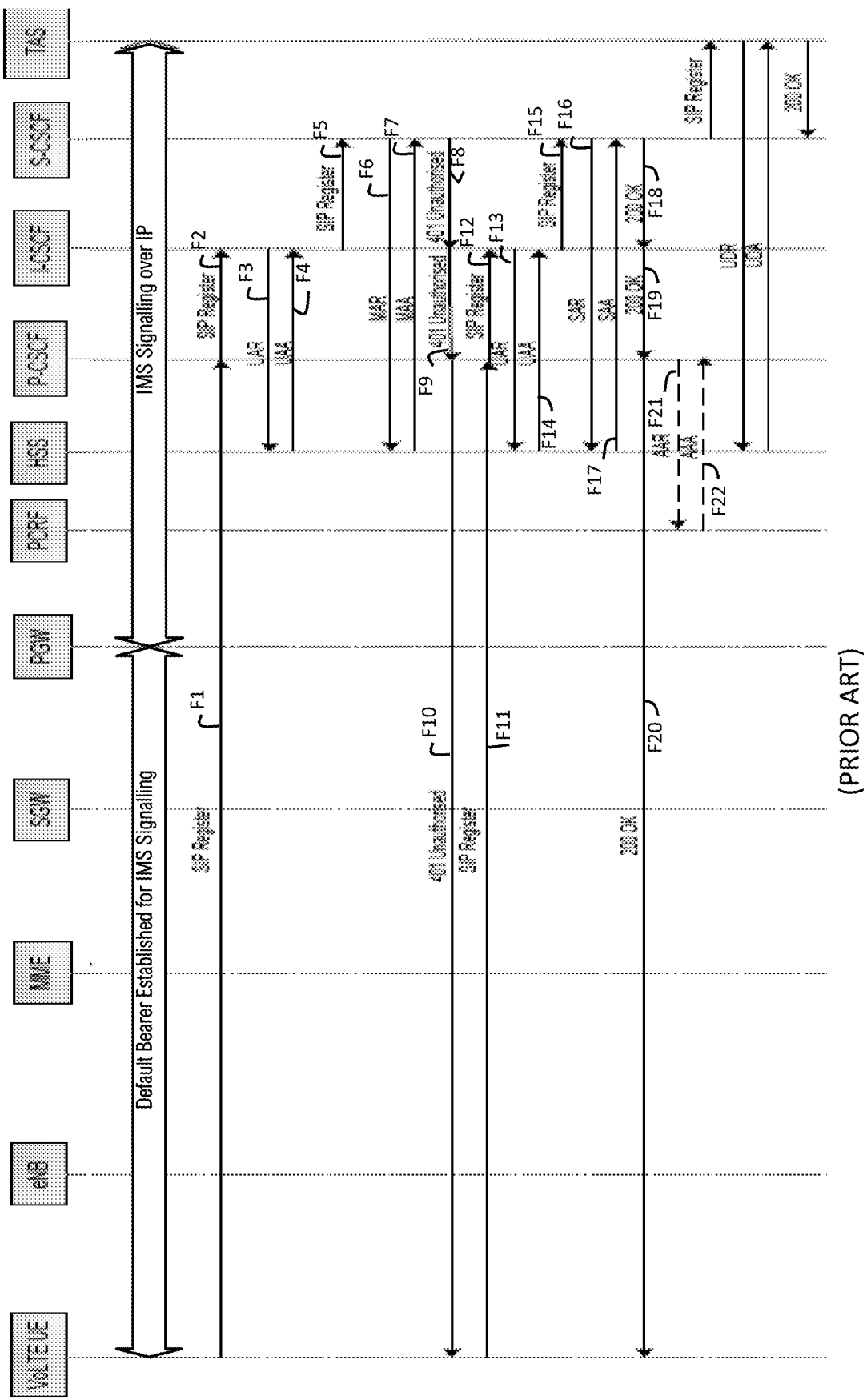
FIG. 5A shows a sequence of messages, known from the prior art, for the registration of a piece of user equipment in an IMS network.

According to a second illustrative example, FIG. 5A shows a sequence of messages, known from the prior art, for performing a registration service of a piece of user equipment UE in an IMS network. This sequence is extracted from FIG. 3 of document "VoLTE Service Description and Implementation Guidelines Version 1.0 18 Dec. 2014".

During a step F1, the piece of user equipment UE sends a message SIP REGISTER to the P-CSCF identified during the registration procedure.

The P-CSCF receives the SIP registration request from the piece of user equipment UE and inserts a header PATH comprising the address SIP-URI of the P-CSCF and transmits the registration request to the I-CSCF during a step F2. The I-CSCF can be determined by a DNS request or can be pre-configured in the P-CSCF.

During a step F3, the I-CSCF sends a Diameter protocol UAR (User Authorization Request) message to the HSS (Home Subscriber Server) server to obtain the identifier of the S-CSCF server associated with the piece of user equipment UE.

The HSS server sends this identifier to the I-CSCF in a UAA (User Authorization Answer) message of the Diameter protocol during a step F4.

During a step F5, the I-CSCF transmits the registration SIP REGISTER request to the S-CSCF.

During a step F6, the S-CSCF sends a MAR (Multimedia Authentication Request) message (Diameter protocol) to the HSS server in order to retrieve authentication vectors from the IMS AKA (Authentication and Key Agreement) security protocol.

During a step F7, the HSS server returns the authentication vectors to the S-CSCF in an MAA (Multimedia Authentication Answer) message of the Diameter protocol.

Upon receiving the IMS AKA authentication vectors, the S-CSCF responds (step F8) to the SIP REGISTER request by sending a response SIP 401 Unauthorized to the I-CSCF indicating the security mechanism to be used.

This response is propagated (step F9) by the I-CSCF to the P-CSCF then (step F10) by the P-CSCF to the piece of user equipment UE.

The piece of user equipment UE extracts parameters RAND and AUTN from this response message SIP, calculates an RES (user RESPONSE) value of the AKA protocol, and encryption and integrity keys.

During a step F11, the piece of user equipment UE sends a new registration request message SIP REGISTER to the P-CSCF, this message comprising the value RES indicating that this message is protected.

The P-CSCF verifies the security parameters and propagates, during a step F12, the registration request message SIP REGISTER to the I-CSCF including the value RES.

During a step F13, the I-CSCF sends a UAR message of the Diameter protocol to the HSS server to retrieve the name of the S-CSCF. The HSS server responds to this message by sending a UAA message of the Diameter protocol during a step F14.

The I-CSCF transmits the message SIP REGISTER to the S-CSCF during a step F15.

During a step F16, the S-CSCF sends an SAR (Server Assignment Request) message of the Diameter protocol to the HSS server to obtain the user profile of the piece of user equipment UE.

The HSS server sends the user profile to the S-CSCF in an SAA (Server Assignment Answer) message of the Diameter protocol during a step F17.

During a step F18, the S-CSCF sends a response message SIP 200 OK to the I-CSCF, which transmits this message to the P-CSCF during a step F19.

The P-CSCF transmits the response SIP 200 OK to the piece of user equipment UE during a step F20 and the piece of user equipment UE is saved with the IMS network.

Optionally, the P-CSCF sends during a step F21 an MR (Authenticate and Authorize Request) message from the Diameter protocol to the PCRF to request to be informed in the event of a communication problem to trigger an IMS deregistration.

The PCRF responds to the P-CSCF with an MA (Authenticate and Authorize Answer) message from the Diameter protocol during a step F22.

Figure 5B:
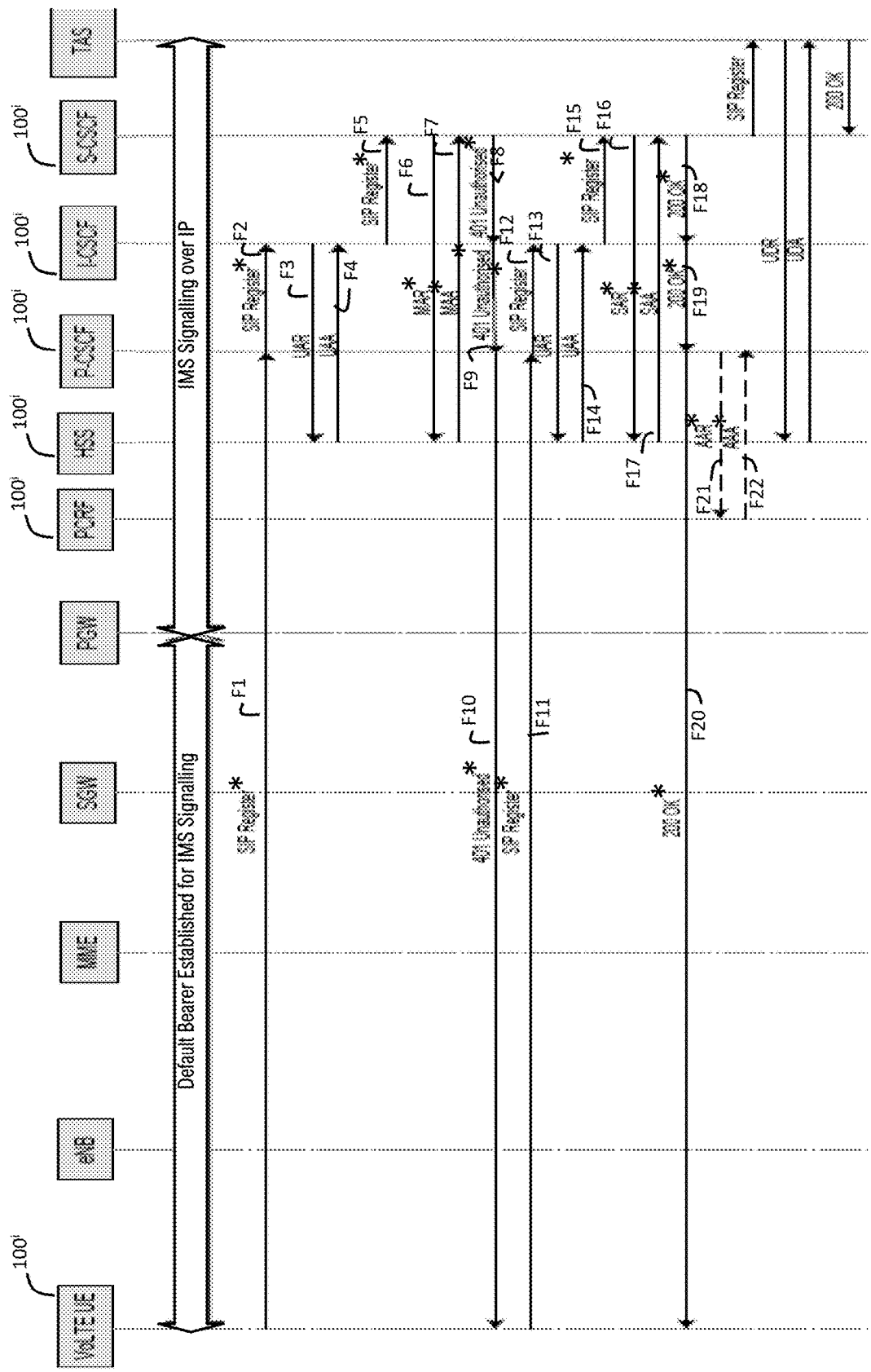
FIG. 5B the figure illustrates an exemplary implementation of the invention in the context of the sequence of messages of FIG. 5A.

FIG. 5B illustrates an exemplary implementation of the invention within the framework of the registration service of a piece of user equipment UE previously described with reference to FIG. 5A.

In this figure, messages are marked with "*" to represent that they comprise a correlation field CID.

In this example, each of the devices UE, P-CSCF, I-CSCF, HSS, PCRF is a device $100^i$ in accordance with the invention and implements the method for processing messages described with reference to FIG. 2.

In this example, when the piece of user equipment UE wants to send a message SIP REGISTER, it executes the process P2 of the method for processing messages. During a step E14, it generates a correlation identifier CID, and saves it in the context CXT associated with the registration service of the piece of equipment UE during a step E16 of this method. It inserts the correlation identifier CID in the message SIP REGISTER (step E90) and sends this message to the P-CSCF identified during the registration procedure (step F1, step E100).

When the P-CSCF receives the message SIP REGISTER (positive result of the test E10), it creates a context CTX for this registration service. It determines (test E20) that this message comprises a correlation identifier CID, and that (test E30) this correlation identifier is not saved in the context CTX. The P-CSCF saves the correlation identifier in the context CTX (step E40) then processes the message SIP REGISTER (step E80). The P-CSCF inserts a PATH header comprising the address SIP-URI of the P-CSCF in the message SIP REGISTER then propagates this message to the I-CSCF (step F2, step E100).

When the ICSCF receives the message SIP REGISTER (positive result of the test E10), it creates a context CTX for the registration service. It determines (test E20) that this message comprises a correlation identifier CID, and that (test E30) this correlation identifier is not saved in the context CTX. The I-CSCF saves the correlation identifier in the context CTX (step E40).

In the embodiment described here, the I-CSCF decides (step E84) not to send the correlation identifier CID in the UAR message of the Diameter protocol sent to the HSS server (step F3, step E100).

The HSS server responds to the UAR message of the Diameter protocol by sending a UAA message comprising the identifier of the S-CSCF to the I-CSCF.

The I-CSCF determines that this UAR message participates in the registration service associated with the context CTX and that this context comprises a correlation identifier CID. It inserts the correlation identifier CID (step E90) in the registration request SIP REGISTER and transmits this request to the S-CSCF (step F5, step E100).

When the S-CSCF receives the message SIP REGISTER (positive result of the test E10), it creates a context CTX for the registration service. It determines (test E20) that this message comprises a correlation identifier CID, and that (test E30) this correlation identifier is not saved in the context CTX. The S-CSCF saves the correlation identifier in the context CTX (step E40).

In the embodiment described here, the S-CSCF decides (step E84) to insert the correlation identifier (step E90) in the MAR message (Diameter protocol) that it sends to the HSS server in order to recover authentication vectors of the IMS AKA security protocol (step F6, step E100).

When the HSS server receives the MAR message (positive result of the test E10), it creates a context CTX for the registration service. It determines (test E20) that this MAR message comprises a correlation identifier CID, and that (test E30) this correlation identifier is not saved in the context CTX. The HSS server saves the correlation identifier in the context CTX and inserts this CID identifier (step E90) in the MAA message (Diameter protocol) comprising the authentication vectors that it transmits this message to the S-CSCF (step F7, step E100).

When the S-CSCF receives the MAA message (result of the positive test E10), it determines (test E20) that this message participates in the performance of the registration service associated with the context CTX and that this context comprises a correlation identifier CID (test E30). The S-CSCF inserts the correlation identifier (step E90) in the message SIP 401 Unauthorized and transmits this message to the I-CSCF (step F8, step E100).

When the I-CSCF receives the message SIP 401 Unauthorized (result of the positive test E10), it determines (test E20) that this message comprises a correlation identifier CID, and that (test E30) this correlation identifier is saved in the context CTX associated with the user UE registration service. The I-CSCF propagates the message SIP 401 Unauthorized to the P-CSCF (step F9, step E100).

When the P-CSCF receives the message SIP 401 Unauthorized (positive result of the test E10), it determines (test E20) that this message comprises a correlation identifier CID, and that (test E30) this correlation identifier is already stored in the context CTX associated with the user UE registration service. The P-CSCF propagates the message 401 Unauthorized to the piece of user equipment UE (step F10, step E100).

When the piece of user equipment UE receives the message SIP 401 Unauthorized (result of the positive test E10), it determines (test E20) that this message comprises a correlation identifier CID, and that (test E30) this correlation identifier CID is already saved in the context associated with the registration service. The piece of user equipment UE processes this message during a step E80. In particular, the piece of user equipment UE extracts parameters RAND and AUTN from this message, calculates a value RES (user RESPONSE) of the AKA protocol, and encryption and integrity keys. The piece of user equipment UE inserts the correlation identifier CID (step E90) in a new registration request message (step E90) SIP REGISTER and transmits this message to the P-CSCF (step F11, step E100).

When the P-CSCF receives the new registration request message SIP REGISTER (result of the positive test E10), it determines (test E20) that this message comprises a correlation identifier CID, and that (test E30) this correlation identifier is already saved in the context associated with the registration service of the user UE. The P-CSCF device processes this message during a step E80, in particular by verifying the security parameters. The P-CSCF device inserts the value RES and propagates the new registration request SIP REGISTER to the I-CSCF (step F12, step E100).

When the I-CSCF receives this new registration request message SIP REGISTER (result of the positive test E10), it determines (test E20) that this message comprises a correlation identifier CID, and that (test E30) this correlation identifier is already saved in the context associated with the registration service of the user UE.

In the embodiment described here, the I-CSCF decides (step E84) not to insert the correlation identifier (step E90) in the UAR message of the Diameter protocol that it sends to the HSS (step F13, step E100).

The HSS server sends the name of the S-CSCF to the I-CSCF in the UAA (Diameter protocol) response message.

The I-CSCF controls that the correlation identifier CID is indeed comprised in the registration request SIP REGISTER received from P-CSCF, and propagates this request to the S-CSCF (step F15, step E100).

When the S-CSCF receives the message SIP REGISTER (result of the positive test E10), it determines (test E20) that this message comprises a correlation identifier CID, and that (test E30) this correlation identifier is already saved in the context associated with the user UE registration service. The S-CSCF inserts the correlation identifier CID (step E90) in the SAR message (Diameter protocol) and transmits this message to the HSS server to obtain the user profile of the piece of user equipment UE (step F16, step E100).

When the HSS server receives the SAR message (result of the positive test E10), it determines (test E20) that this message comprises a correlation identifier CID, and that (test E30) this correlation identifier is already saved in the context associated with the user EU registration service. The HSS server inserts the correlation identifier (step E90) in the SAA message (Diameter protocol) containing the user profile and transmits this message to the S-CSCF (step F17, step E100).

When the S-CSCF receives the SAA message (result of the positive test E10), it determines (test E20) that this message comprises a correlation identifier CID, and that (test E30) this correlation identifier is already saved in the context associated with the user EU registration service. The S-CSCF inserts the correlation identifier (step E90) in the response message SIP 200 OK and transmits this message to the I-CSCF (step F18, step E100).

When the I-CSCF receives the response message 200 OK (positive result of the test E10), it determines (test E20) that this message comprises a correlation identifier CID, and that (test E30) this correlation identifier is already saved in the context associated with the registration service of the user UE. The I-CSCF propagates the response message 200 OK to the P-CSCF (step F19, step E100).

When the P-CSCF receives the response message 200 OK (result of the positive test E10), it determines (test E20) that this message comprises a correlation identifier CID, and that (test E30) this correlation identifier is already saved in the context associated with the registration service of the user UE. The P-CSCF propagates the response message 200 OK to the piece of user equipment UE (step F20, step E100).

Optionally, the P-CSCF inserts the correlation identifier CID in the AAR message of the Diameter protocol that it sends to the PCRF to request to be informed in the event of a communication problem to trigger an IMS deregistration (step F21).

The PCRF responds to the P-CSCF with an MA (Authenticate and Authorize Answer) message comprising the correlation identifier CID during a step F22.

Figure 6A:
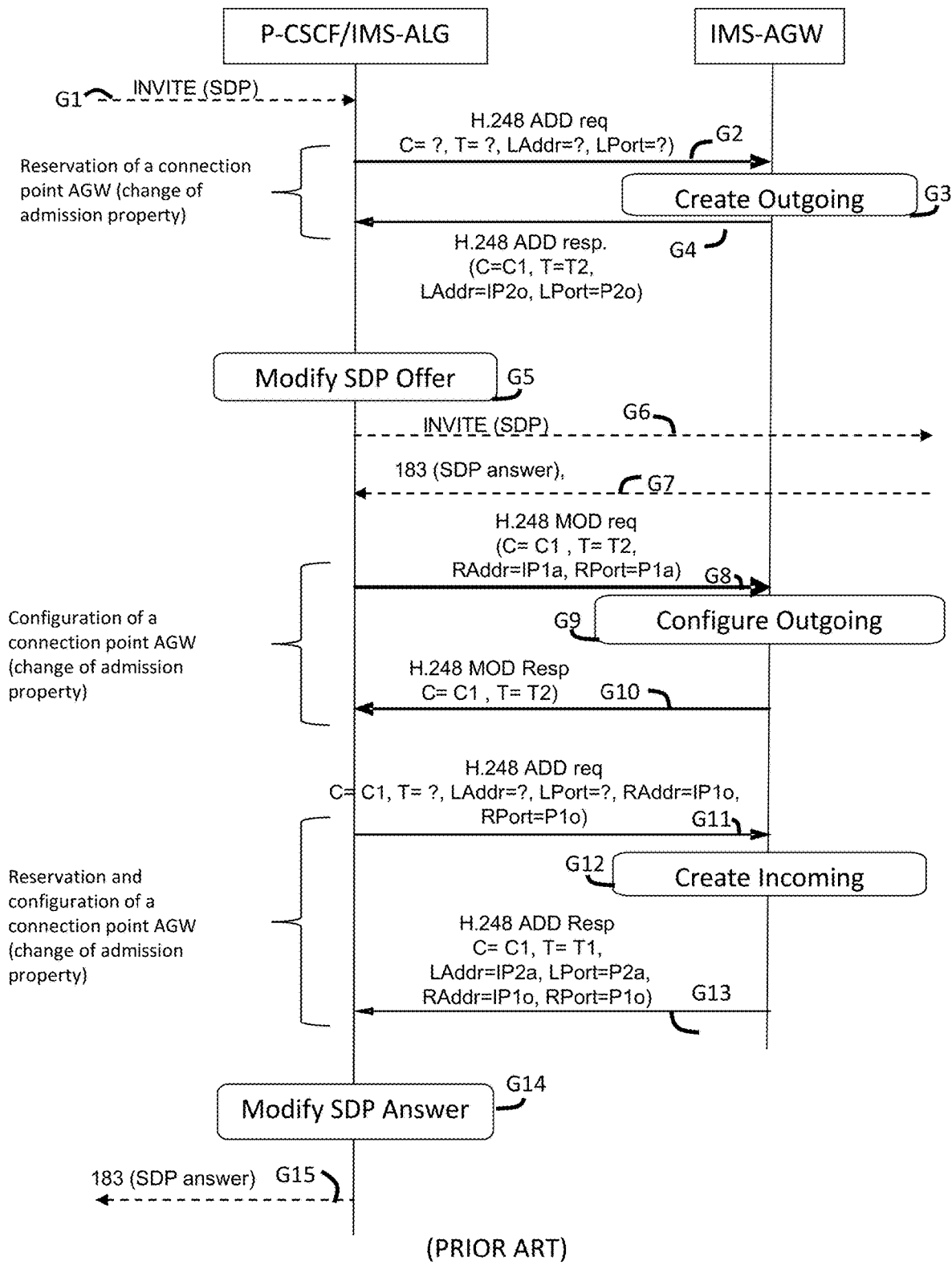
FIG. 6A illustrates a signaling flow in accordance with the prior art to configure a session of the IMS access network.
Figure 6B:
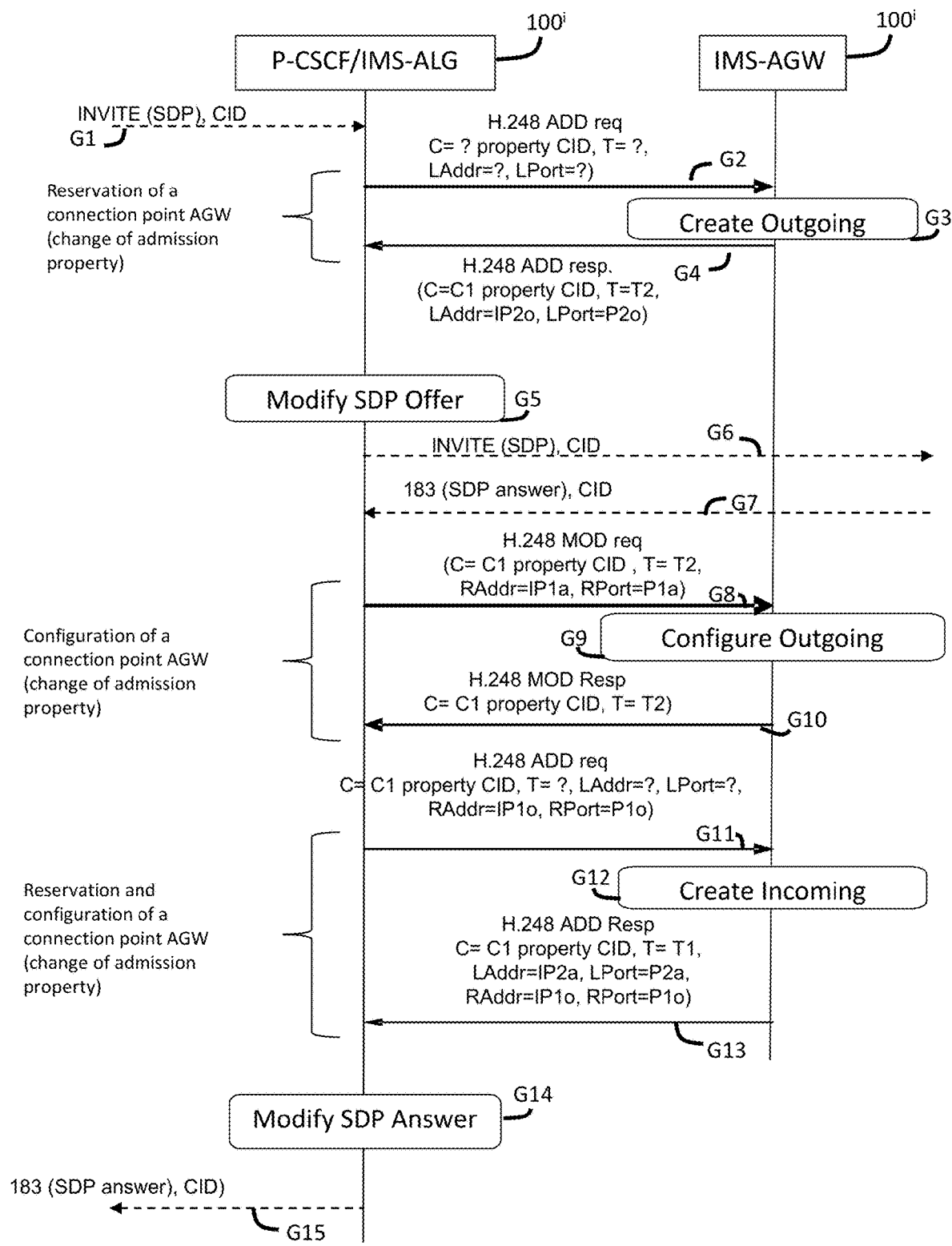
FIG. 6B illustrates how the messages of FIG. 6A can be modified by an exemplary implementation of the invention.

With reference to FIGS. 6A and 6B, an embodiment of the invention will now be described in an example of interoperability between the SIP and H.248 protocols, for example within the framework of a videoconference service.

To this end, FIG. 6A illustrates a signaling flow in accordance with the prior art for configuring a session from the IMS access network to the IMS core when the P-CSCF invokes the IMS-ALG (IMS Application Level Gateway) function. This figure corresponds to FIG. 6.2.1.2 of document 3GPP TS 23.334 version 12.

During a step G1, the IMS-ALG (IMS Application Level Gateway) gateway receives an SDP offer in SIP signaling.

Upon receiving a session initiation request, the IMS-ALG gateway extracts the destination network address(es) and the port number(s) of the offerer from the body of the signaling message received from the endpoint of the calling party. During a step G2, it asks the IMS-AGW gateway to allocate IP transport resources (T2) via the procedure Reserve AGW Connection Point. During a step G3, the IMS-AGW gateway creates the outbound termination. Upon receiving the response from the IMS-AGW gateway, the IMS-ALG gateway modifies the destination address and/or the port(s) of the offerer contained in the body of the message for signaling the application and propagates (step G4) the session setup to the calling party.

During a step G5, the IMS-ALG gateway replaces the IP address in the SDP using the information received from the IMS-AGW gateway.

During a step G6, the IMS-ALG gateway transmits the new SDP offer to the called party.

During a step G7, the SDP answer is received from the party called by the IMS-ALG gateway.

Upon receiving the SDP from the terminating party, the IMS-ALG gateway sends (step G8) a command H248 MD Req to the IMS-AGW gateway as part of the "Configure AGW Connection Point" procedure and asks the IMS-AGW gateway to allocate transport resources (T1) via the "Reserve and Configure AGW Connection Point" procedure. During a step G9, the IMS-AGW gateway (ATGW) configures the outgoing termination. During a step G10, the IMS-AGW gateway responds to the IMS-ALG gateway with a message H.248 MOD Resp.

Upon receiving the response from the IMS-AGW gateway, the IMS-ALG gateway sends a message H.248 ADD Req to create the inbound termination. During a step G12, the IMS-AGW gateway creates the inbound termination. During a step G13, the IMS-AGW gateway responds to the IMS-ALG gateway with a message H.248 ADD Resp and provides the address and port of the incoming termination.

During a step G14, the IMS-ALG gateway replaces the IP address in the SDP answer using the information received from the IMS-AGW gateway.

During a step G15, the message SDP answer is sent in response to the command INVITE received in step G1.

FIG. 6B illustrates how the messages of FIG. 6A can be modified by an example of implementation of the invention.

More specifically, in this example:

the correlation identifier CID is present in the message SIP Invite received in step G1. When the IMS-ALG gateway implements the method for processing messages, it determines (step E20) that the correlation identifier is in the message SIP INVITE, it determines (step E30) that the correlation identifier is not in the context CTX associated with the videoconference service, therefore saves it in this context (step E40), inserts it in the message H248 ADD req (step E90) that it sends to the IMS AGW gateway (step G2, step E100);

when the IMS-AGW gateway receives the message H248 ADD req (step G2), it implements the method for processing this message and determines (step E20) that the correlation identifier is present in this message. It determines (step E30) that the correlation identifier CID is not in the context CTX associated with the videoconference service and saves it in this context (step E40). The MS AGW gateway then processes the message H238 ADD Req by creating the outgoing termination (step E80, step G3). Then, the IMS AGW gateway inserts the correlation identifier CID in the message H248 ADD resp (step E90) that it sends to the IMS ALG gateway (step G4, step E100);

when the IMS-ALG gateway receives the message H248 ADD resp (step G4), it implements the method for processing this message and determines (step E20) that the correlation identifier CID is present in this message. It determines (step E30) that the correlation identifier CID is already in the context CTX associated with the videoconference service. The IMS AGW gateway then processes the message H238 ADD Resp by replacing the IP address in the SDP using the information received from the IMS-AGW gateway (step E80, step G5). The IMS ALG gateway inserts the correlation identifier in a message SIP INVITE (step E90) that it sends to the called party (step G6, step E100). The IMS ALG gateway also inserts the correlation identifier CID in a message H248 MOD req (step E90) that it sends to the AGW gateway (step G8, step E100);

when the called party receives the message SIP INVITE (step G6), it implements the method for processing this message and determines (step E20) that the correlation identifier is present in this message. It determines (step E30) that the correlation identifier CID is not in the context CTX associated with the videoconference service and therefore saves it in this context (step E40). The called party inserts the correlation identifier CID in the message 183 SIP Progress (step E90) that it sends to the IMS ALG gateway (step G7, step E100);

when the AGW gateway receives the message H248 Mode req (step G8), it implements the method for processing this message and determines (step E20) that the correlation identifier is present in this message. It determines (step E30) that the correlation identifier CID is saved in the context CTX associated with the videoconference service. The AGW gateway then processes the message H248 MOD Req by configuring the outgoing termination (step E80, step G9). The AGW gateway inserts the correlation identifier CID in the message H28 MOD Resp (step E90) that it sends to the IMS ALG gateway (step G10, step E100);

when the ALG gateway receives the message H248 Mode resp (step G10), it implements the method for processing this message and determines (step E20) that the correlation identifier is present in this message. It determines (step E30) that the correlation identifier CID is saved in the context CTX associated with the videoconference service. The AGW gateway inserts the correlation identifier CID in the message H28 ADD req (step E90) that it sends to the IMS AGW gateway (step G11, step E100);

when the AGW gateway receives the message H248 ADD req (step G11), it implements the method for processing this message and determines (step E20) that the correlation identifier is present in this message. It determines (step E30) that the correlation identifier CID is saved in the context CTX associated with the videoconference service. The AGW gateway then processes the message H248 MOD Req by creating the incoming termination (step E80, step G12). The AGW gateway inserts the correlation identifier CID in the message H248 ADD Resp (step E90) that it sends to the IMS ALG gateway (step G13, step E100);

when the IMS-ALG gateway receives the message H248 ADD resp (step G13), it implements the method for processing this message and determines (step E20) that the correlation identifier is present in this message. It determines (step E30) that the correlation identifier CID is already in the context CTX associated with the videoconference service. The IMS AGW gateway then processes the message H248 ADD Resp by replacing the IP address in the SDP answer using the information received from the IMS-AGW gateway (step E80, step G14). The IMS ALG gateway inserts the correlation identifier in the message SIP 183 (step E90) that it sends to the calling party (step G15, step E100).

With reference to the previous figures, it has been demonstrated on several examples, how a device $100^i$ can maintain in its context CTX a correlation identifier CID comprised in the messages received $MSGE^i_E$ or emitted $MSG^i_S$ within the framework of the performance of a given service (registration of a piece of user equipment in a network, establishment of communication between several pieces of user equipment, access to a videoconference service, . . . ).

Figure 7:
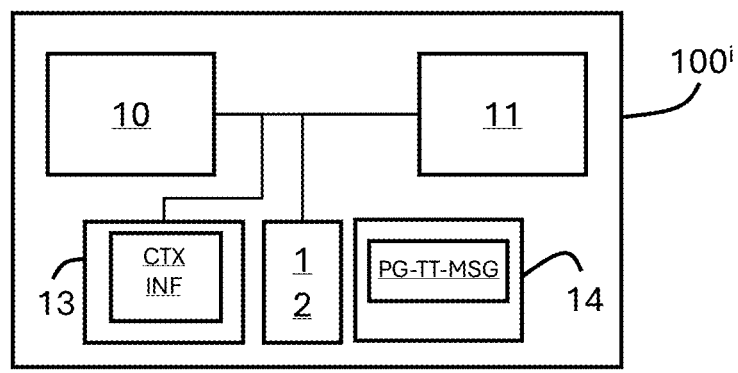
FIG. 7 shows the hardware architecture of a device for processing messages in accordance with a particular embodiment of the invention.

FIG. 7 shows the hardware architecture of a device $100^i$ in accordance with a particular embodiment of the invention. In the embodiment described here, this device has the hardware architecture of a computer. It comprises a processor 10, communication means 11, a random access memory of the RAM type 12, a rewritable non-volatile memory 13 and a read only memory 14. The read only memory constitutes an information medium for storing a computer program PG-TT-MSG in accordance with the invention. When the processor 10 executes this computer program, it implements the method for processing messages described with reference to FIG. 2. The context CTX associated with a service is saved in the rewritable non-volatile memory 13.

Figure 8:
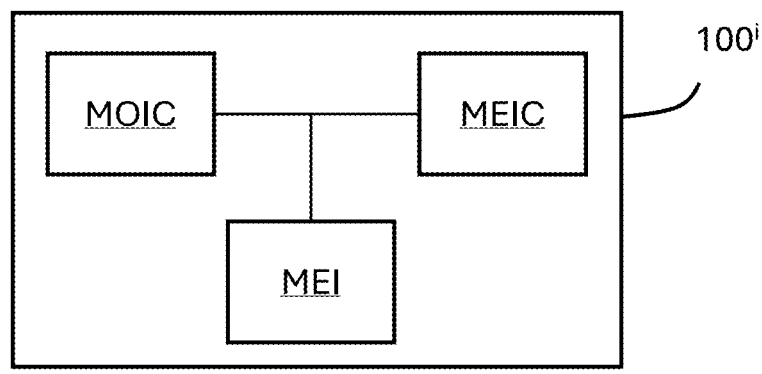
FIG. 8 shows the functional architecture of a device for processing messages in accordance with a particular embodiment of the invention.

FIG. 8 shows the functional architecture of a device $100^i$ in accordance with a particular embodiment of the invention. This device can be implemented in hardware as shown in FIG. 7. It comprises:

an MOIC module configured to obtain a correlation identifier CID associated uniquely with a service performed by a telecommunication network, this correlation identifier being able to establish a correlation between messages associated with this service regardless of the protocols with which said messages conform and/or interfaces over which said messages are conveyed;

an MEIC module configured to save a correlation identifier in a context CTX associated with this service;

an MCOM communication module; and a control module MCT configured to control that each message sent by the device $100^i$ with a view to performing the service comprises the correlation identifier associated with this service.

This control module is in particular configured to ensure, before propagating a received message to another device, that the propagated message indeed comprises the correlation identifier if this identifier must be sent to this device.

The invention claimed is:

1. A method for processing messages implemented by a device in a telecommunication network, this method comprising:

a step of obtaining a correlation identifier associated uniquely with a service performed by the telecommunication network, said correlation identifier being able to establish a correlation between messages that are associated with said service regardless of protocols with which said messages conform or of interfaces over which said messages are conveyed;

a step of saving said correlation identifier in a context associated with said service; and a step of sending at least one message with a view to performing said service, each message sent comprising said correlation identifier saved in the context associated with said service, said method comprising, for a message received by a said device relating to said service:

verifying whether the received message comprises said correlation identifier, upon a determination that the received message does not comprise said identifier and upon a determination that said correlation identifier is not saved in the context associated with said service, the step of obtaining said correlation identifier being performed by generating by said device said correlation identifier and the step of saving said correlation identifier in a context associated with said service being performed by saving said generated correlation identifier in the context associated with said service, said context being saved in a memory of said device.

2. The method of claim 1, wherein said message from said device conforms with a first protocol, and at least one sent message during the sending of at least one message conforms with a second protocol distinct from the first protocol.

3. The method of claim 1, wherein at least one message sent or received conforms with one protocol among:
Session Initiation Protocol (SIP) protocol,
Diameter protocol,
GTPv2 protocol, and
H.248 protocol.

4. The method of claim 1, wherein said device receives a message relating to said service and not comprising a correlation identifier, and wherein said device generates said correlation identifier upon receiving said message.

5. The method of claim 1, wherein each message sent with a view to performing said service comprises said correlation identifier unless said message is sent over a communication interface verifying a predefined criterion or to an external network verifying a predefined criterion.

6. The method of claim 5, wherein said predefined criterion is at least one of:
said communication interface is a radio interface; or
said external network does not have an agreement with said telecommunication network.

7. The method of claim 1, wherein said correlation identifier comprises at least a randomly generated part.

8. The method of claim 1, wherein said correlation identifier comprises at least a part identifying said device.

9. The method of claim 1, wherein said service is one of:
a network registration service;
a service for establishing communication on the network;
a videoconference service;
a service for sending a short message; or
a service for subscription to an event of said network.

10. The method of claim 1, wherein the correlation identifier is saved in a memory of said device.

11. The method of claim 1, further comprising:
collecting all messages involved in the implementation of said service based on said correlation identifier regardless of protocols of these messages, and
establishing diagnosis of a problem from these messages.

12. A non-transitory computer-readable recording medium on which a computer program is recorded comprising instructions which, when executed by a computer, cause the computer to implement execution of steps of a training method for processing messages, the training method comprising:

a step of obtaining a correlation identifier associated uniquely with a service performed by a telecommunication network, said correlation identifier being able to establish a correlation between messages that are associated with said service regardless of protocols with which said messages conform or of interfaces over which said messages are conveyed;

a step of saving said correlation identifier in a context associated with said service; and a step of sending at least one message with a view to performing said service, each message sent comprising said correlation identifier saved in the context associated with said service, said training method comprising, for a message received by a said device relating to said service:

verifying whether the received message comprises said correlation identifier, upon a determination that the received message does not comprise said identifier and upon a determination that said correlation identifier is not saved in the context associated with said service, the step of obtaining said correlation identifier being performed by generating by said device said correlation identifier and the step of saving said correlation identifier in a context associated with said service being performed by saving said generated correlation identifier in the context associated with said service, said context being saved in a memory of said device.

13. A device for processing messages, said device comprising:
communication means,
at least one processor, and
at least one non-transitory computer readable medium comprising instructions stored thereon which when executed by the at least one processor configure the system to implement a method comprising:

a step of obtaining a correlation identifier associated uniquely with a service performed by a telecommunication network, said correlation identifier being able to establish a correlation between messages that are associated with said service regardless of protocols with which said messages conform or of interfaces over which said messages are conveyed;

a step of saving said correlation identifier in a context (CTX) associated with said service; and a step of controlling that each message sent by the device with a view to performing said service comprises said correlation identifier associated with said service, said method comprising, for a message received by a said device relating to said service:

verifying whether the received message comprises said correlation identifier, upon a determination that the received message does not comprise said identifier and upon a determination that said correlation identifier is not saved in the context associated with said service, the step of obtaining said correlation identifier being performed by generating by said device said correlation identifier and the step of saving said correlation identifier in a context associated with said service being performed by saving said generated correlation identifier in the context associated with said service, said context being saved in a memory of said device.

14. A system comprising at least a first device, wherein the first device comprises the device according to claim 13.

15. The system of claim 14, further comprising at least a second device, wherein the second device comprises:
communication means,
at least one processor, and
at least one non-transitory computer readable medium comprising instructions stored thereon which when executed by the at least one processor configure the system to implement a method comprising:
   a step of obtaining a correlation identifier associated uniquely with the service performed by a telecommunication network, said correlation identifier being able to establish a correlation between messages that are associated with said service regardless of protocols with which said messages conform or of interfaces over which said messages are conveyed;
   a step of saving said correlation identifier in a context associated with said service; and
   a step of controlling that each message sent by the second device with a view to performing said service comprises said correlation identifier associated with said service,
said method comprising, for a message received by said device relating to said service:
   verifying whether the received message comprises said correlation identifier,
   upon a determination that the received message does not comprise said identifier and upon a determination that said correlation identifier is not saved in the context associated with said service, the step of obtaining said correlation identifier being performed by generating by said device said correlation identifier and the step of saving said correlation identifier in a context associated with said service being performed by saving said generated correlation identifier in the context associated with said service,
said context being saved in a memory of said device, said first and second devices being configured to:
   obtain and send the correlation identifier associated uniquely with the service, and in which:
   the messages comprising said correlation identifier and sent by said first and second devices with a view to performing said service conform with different protocols; and/or
   the interfaces used by said first and second devices to convey the messages comprising said correlation identifier and sent by said devices with a view to performing said service are different.

16. The system of claim 14, further comprising:
   at least one storage space in which said messages containing said correlation identifier associated with said service are stored;
   wherein the system is further configured to extract at least one message from said at least one storage space using said correlation identifier.

17. A method for processing messages implemented by a device in a telecommunication network, this method comprising:
   a step of obtaining a correlation identifier associated uniquely with a service performed by the telecommunication network, said correlation identifier being able to establish a correlation between messages that are associated with said service regardless of protocols with which said messages conform or of interfaces over which said messages are conveyed;
   a step of saving said correlation identifier in a context associated with said service; and
   a step of sending at least one message with a view to performing said service, each message sent comprising said correlation identifier saved in the context associated with said service, wherein said method comprising for a message received by said device relating to said service:
   verifying whether the received message comprises said correlation identifier,
   upon a determination that the received message comprises said identifier and upon a determination that said correlation identifier is not saved in the context associated with said service, the step of obtaining said correlation identifier being performed by extracting from a dedicated field of the received message the correlation identifier and the step of saving said correlation identifier in a context associated with said service being performed by saving said extracted correlation identifier in the context associated with said service, said context being saved in a memory of said device.

* * * * *